June 17, 1969 M. GOLDBERG 3,450,366

SELF-THREADING FILM REEL WITH FREE-WHEELING HUBS

Filed Jan. 8, 1968

INVENTOR.

MORRIS GOLDBERG

BY Anderson Spangler & Wymore

United States Patent Office 3,450,366
Patented June 17, 1969

3,450,366

SELF-THREADING FILM REEL WITH FREE-WHEELING HUBS

Morris Goldberg, Denver, Colo., assignor to Goldberg Brothers, Inc., Denver, Colo., a corporation of Colorado Filed Jan. 8, 1968, Ser. No. 696,191
Int. Cl. B65h 75/28
U.S. Cl. 242—74 7 Claims

ABSTRACT OF THE DISCLOSURE

This invention relates to a motion picture film reel of the self-threading type having a drive spindle hub mounted within the reel hub for relative rotation when the forces exerted upon the reel hub by the film tending to restrain same approach a magnitude sufficient to tear the sprocket holes. The reel also includes free-wheeling flanges mounted upon the reel hub which will turn relative thereto without imparting significant inertia when the reel hub is stopped suddenly as the teeth thereon engage the sprocket holes in the film.

Many different types and styles of self-threading motion picture film reels are available commercially which include some type of slip-clutch arrangement on the reel hub that will yield without tearing out the sprocket holes until the speed of the hub approaches that of the reel drive spindle. Most of these units include some type of multitoothed disk or ring in frictional engagement with the hub that will slip relative thereto when one of the teeth engages in a sprocket hole with the take-up reel being driven at high speed by the projector motor. In nearly all instances, the reel hub is mounted directly on the projector's take-up reel drive spindle for conjoint rotation therewith. The usual threading technique is to start the take-up reel rotating by means of the projector drive motor and lay the film leader against the reel hub until one of the slip-clutch teeth engages a sprocket hole.

Unfortunately, the slip-ring and friction-disk versions of the prior art self-threading reels have not proven to be entirely satisfactory. The slip-ring version, for example, has a pronounced tendency to engage and grip the reel hub tightly as soon as one or more coils of film are wrapped therearound, especially if the operator continues to maintain tension on the film. When this occurs, the sprocket holes will tear out quite often because the film has not yet reached the speed of the hub and take-up reel drive spindle. If one releases the leader the instant it engages the teeth and the projector is allowed to feed film to the take-up reel so as to lessen the initial load on the sprocket holes, the unit seems to work quite well but a certain amount of skill is obviously required which is not always present in the operator.

The friction-disk type, on the other hand, oftentimes becomes too loose especially after repeated use. The toothed disk ordinarily makes sliding contact with the side of the hub in some way and a very delicate frictional balance must be maintained for it to function properly. If it is too tight, the sprocket holes in the leader will tear out because the disk and hub will rotate at much the same speed. Usually, however, the disk becomes sprung slightly and will no longer make sufficiently tight contact with the hub to turn therewith. The net result is, of course, that the film becomes very loosely wound on the take-up reel.

It has now been found in accordance with the teaching of the instant invention that the aforementioned difficulties can, in large measure, be overcome by fastening the toothed ring to the reel hub for conjoint rotation or providing the hub itself with teeth while allowing the drive spindle to turn relative thereto by inserting a separate frictionally-held spindle hub in the center of the reel hub. In other words, the spindle hub is mounted directly on the drive spindle for the take-up reel while the reel hub is mounted on said spindle hub for relative rotation once the forces tending to retard rotation of said reel hub approach a magnitude at which the sprocket holes are likely to tear out. Thus, the friction clutch produced within the hub is purely film-tension responsive and is independent of the number of coils of film that wrap around the reel hub. Also, the film does not come into contact with the clutch mechanism in a way that could spring it or otherwise adversely effect its operation as is the case with both the slip-ring and friction-disk type clutches.

There is yet another problem that has a profound influence on the propensity of these self-threading reels to tear out the sprocket holes regardless of the type of friction clutch employed including that of the present invention. Initially, all elements of the reel are turning at the speed of the take-up reel spindle by which it is being driven. Then, as the tooth engages in a sprocket hole of the leader, the tooth-carrying element stops instantaneously while the remaining elements of the reel tend to keep on turning due to the rotational inertia developed therein.

It is, therefore, the principal object of the present invention to provide a novel and improved self-threading motion picture film reel.

A second objective is the provision of a device of the type aforementioned that has a different and superior type of friction clutch.

Another object of the invention herein disclosed and claimed is to provide a film reel with free-wheeling flanges that impart little, if any, significant inertial load to the film as the pick-up is made.

Still another objective is the provision of a reel for movie film wherein the toothed pick-up mechanism is isolated from the friction clutch insofar as damage to the former will cause a malfunction in the latter.

Further objects are to provide a self-threading film reel that is easy to thread, simple, inexpensive, lightweight, compact, rugged, versatile and decorative in appearance.

Other objects will be in part apparent and in part pointed out specifically hereinafter in connection with the description of the drawing that follows, and in which.

Figures 1, 2, 4:
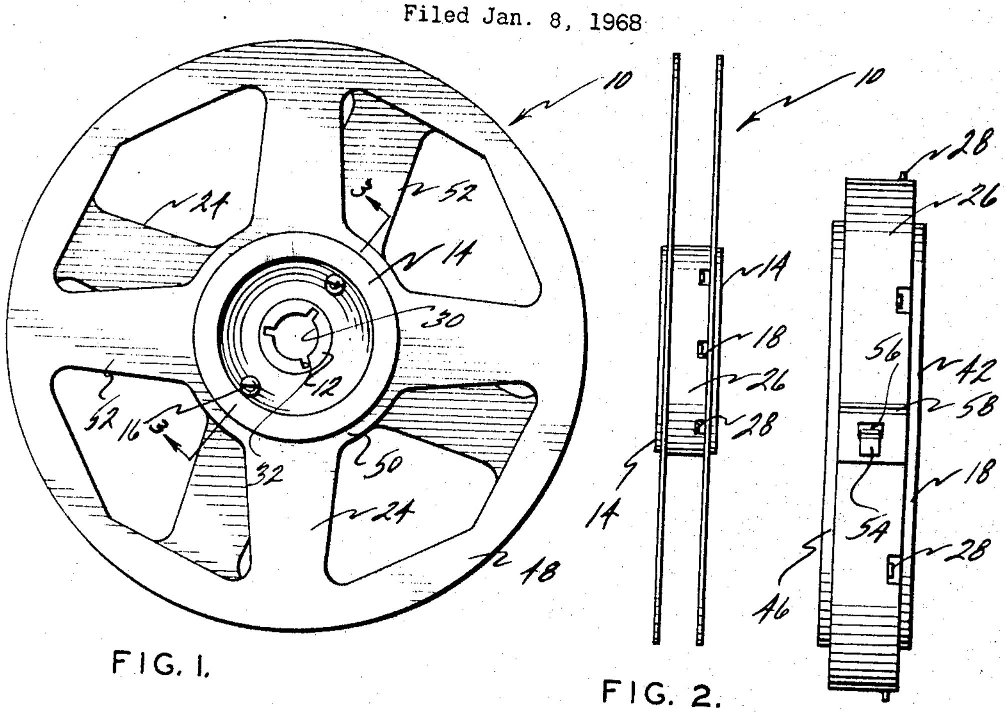
FIGURE 1 is a side elevation of the entire reel.
FIGURE 2 is an edge view thereof.
FIGURE 4 is an enlarged edge view of the reel hub and toothed ring encircling same without the side plates or spindle hub.

Referring now to the drawings for a detailed description of the present invention and, initially, to FIGURES 1 and 2 for this purpose, reference numeral 10 has been employed to designate the self-threading reel in a general way which will be seen to include a short tubular spindle hub 12 bordered on both ends by side plates 14 held in assembled relation by fasteners 16. Surrounding the spindle hub 12 in circumferentially-spaced relation thereto is a hollow cylindrical reel hub 18 that rests upon annular shoulders 20 provided on the inside faces of the side plates. The reel hub and side plates cooperate to define a pair of transversely-spaced parallel circumferential grooves 22 (FIGURE 3) that loosely retain flanges 24 for free relative rotation. Surrounding the reel hub and fastened nonrotatably thereto is a ring 26 that includes integrally-formed teeth 28 projecting therefrom adjacent one edge.

Figure 3:
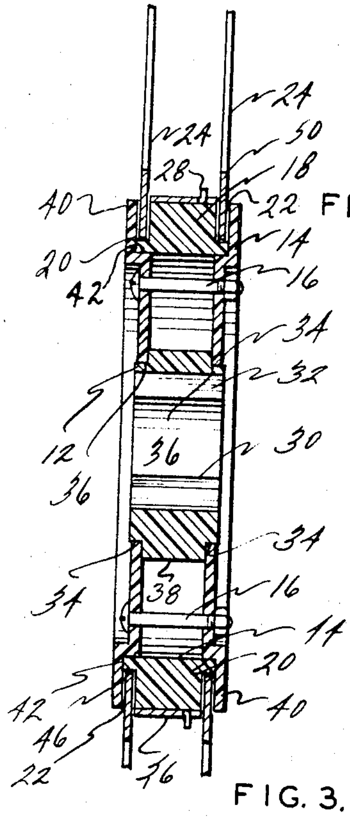
FIGURE 3 is an enlarged fragmentary section taken along line 3—3 of FIGURE 1.
Figure 6:
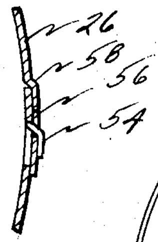
FIGURE 6 is a fragmentary section showing the manner in which the ends of the toothed ring are fastened together.
Figure 5:
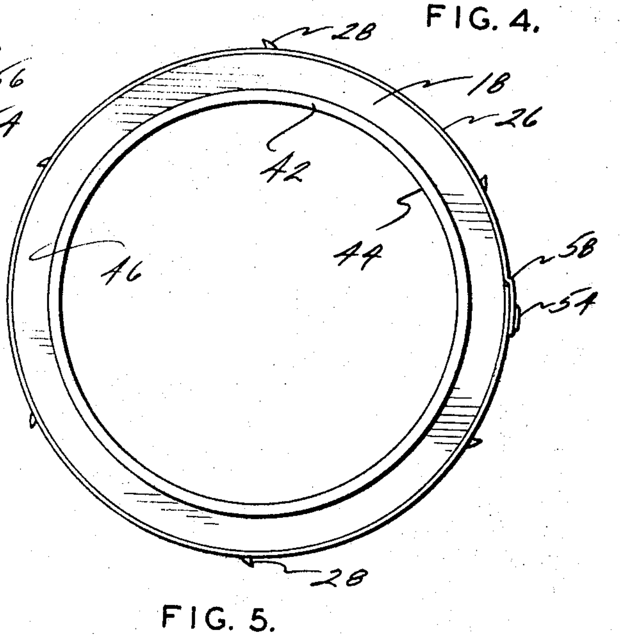
FIGURE 5 is a side elevation of the reel hub of FIGURE 4.

In FIGURES 3, 4 and 5 to which reference will now be made, it will be seen that spindle hub 12 has the opening 30 therein sized to receive the take-up reel drive spindle (not shown) of a motion picture projector. Three equi-angularly-spaced radial slots 32 emanate from the central opening 30 and adapt same to receive the radial drive pin or pins carried by the spindle.

The outer cylindrical surface of the spindle hub is formed to provide annular grooves 34 on opposite ends thereof that are frictionally received within the central openings 36 in the side plates and cooperate therewith to form a friction clutch as will be explained in greater detail presently. The annular shoulder 38 separating the grooves 34 provides an abutment that holds the side plates in fixed-spaced parallel relation and also produces the primary friction surface of the clutch.

In the particular form illustrated, the fasteners 16 comprise a bolt with a nut screwed thereon which can be used to vary the pressure the side plates exert against the spindle hub so that the force necessary to produce relative rotation therebetween can be controlled and preset to that magnitude sufficient to develop a driving connection therebetween without tearing out the sprocket holes in the film leader. In other words, the frictional force between these elements must be sufficient to wind the film onto the take-up reel without slippage yet yield whenever the counteracting forces thereon approach a value that will cause the teeth 28 to tear out the sprocket holes in the film. It is also possible, of course, to substitute rivets or some other form of fastener, both adjustable and non-adjustable, for the nut and bolt type shown.

The peripheral margins of the side plates 14 are offset outwardly to define the annular shoulders 20 upon which the reel hub 18 rests. The offset portions 40 of the side plates are pulled in snugly against the annular ribs 42 that project out laterally from both sides of the reel hub along the inside cylindrical surface 44 thereof. The outer cylindrical surfaces 46 of these ribs define hubs upon which the reel flanges 24 rotate. Cylindrical surfaces 46 together with the opposed spaced parallel surfaces of the offset portions 40 of the side plates and the reel hub 18 cooperate to define the circumferential grooves 22 that retain the flanges 24 for free relative rotational movement.

FIGURES 1, 2 and 3 reveal the flanges 24 most clearly to comprise circular flat metal disks cut out to define a rim portion 48 connected to a hub portion 50 by a plurality of radial spokes 52. The flanges project outward radially in spaced parallel relation from the reel hub and cooperate to confine the coils of film reeled upon the latter. The free-wheeling mounting of these flanges on the reel hub allow them to continue rotating with the spindle hub when the reel hub stops as the teeth engage the sprocket holes thereby imparting very little of their rotational inertia to the film that might otherwise cause it to break or the sprocket holes therein to tear.

Finally, with reference to FIGURES 2–6, inclusive, it will be seen that ring 26 comprises a split thin metal band having a bindable tab 54 freed near one end and an aperture 56 on the other. The end containing the aperture is preferably offset slightly as indicated at 58 to permit the tabbed end to pass therebeneath. When the ring is placed around the reel hub, the ends thereof overlap to a point where the tab 54 can enter aperture 56 and be bent over to secure same in assembled relation. The ring does not rotate relative to the reel hub but is securely fastened thereto.

The sides of the ring are notched to free the integrally-formed forwardly-leaning teeth 28 that are aligned to enter one of the sprocket holes in the line thereof that borders the film on one side. The teeth are canted as shown in FIGURE 5 in the direction of reel rotation.

In use, the take-up reel spindle of the projector is inserted into the spindle hub 12 so as to form a driving connection therewith. The reel is mounted on the spindle so that the reel hub turns counterclockwise as viewed in FIGURE 5. With the reel turning, the leader is laid against the reel hub until one of the teeth 28 catches within a sprocket hole; whereupon, the reel hub and side plates associated therewith stop while the spindle hub and flanges continue to rotate. Gradually, the friction developed by the slippage between the spindle hub and side plates overcomes the resistance on the film and the reel hub will begin to turn winding the film thereon. Within a few seconds at the most, all relative motion between the spindle hub and side plates ceases and all elements of the reel begin to rotate in unison. By this time, there are probably enough coils of film on the reel hub to engage the flanges and substantially eliminate any further relative rotation between these elements.

Having thus described the several useful and novel features of the film reel of the present invention, it will be apparent that the several worthwhile objectives for which it was developed have been achieved. Although but a single specific embodiment has been illustrated, I realize that certain changes and modifications therein may well occur to those skilled in the art within the broad teaching hereof; hence, it is my intention that the scope of protection afforded hereby shall be limited only insofar as said limitations are expressely set forth in the appended claims.

What is claimed is:

1. The self-threading motion picture film take-up reel which comprises: inner hollow cylindrical hub-forming means adapted to receive the take-up reel drive spindle of a motion picture projector and form a driving connection therewith; outer cylindrical hub-forming means having a central opening therein sized to receive the inner hub-forming means in concentric relation while leaving an annular space therebetween, said outer hub-forming means having at least one tooth projecting from the external cylindrical surface thereof in position to engage a sprocket hole in a length of motion picture film to be wound thereon; a pair of centrally-apertured disks bridging the annular space between the inner and outer hub-forming means defining side plates therefor, the portions of said side plates bordering the central apertures therein engaging the adjacent surfaces of the inner hub-forming means to form a friction clutch adapted to release and permit relative rotational movement therebetween upon the application of a retarding force to said outer hub-forming means of a magnitude less than that at which the tooth carried thereby will tear out the sprocket holes in the film, and said side plates engaging the adjacent surfaces of the outer hub-forming means so as to cooperate therewith in defining a pair of transversely-spaced parallel radial grooves extending outwardly therefrom; and a pair of centrally-apertured disk-shaped planar flanges having the portions thereof bordering the apertures seated within the annular grooves, said flanges being spaced apart a distance slightly greater than the width of the film to be wound on the outer hub-forming means, and said flanges cooperating with one another to retain the coils of film wound on the outer hub-forming means therebetween.

2. The self-threading motion picture film reel as set forth in claim 1 in which: the flanges are freely-rotatable within the annular groove.

3. The self-threading motion picture film reel as set forth in claim 1 in which: fasteners within the annular space between the inner and outer hub-forming means interconnect the side plates, said fasteners being adjustable to vary the pressure said side plates exert upon said inner hub-forming means.

4. The self-threading motion picture film reel as set forth in claim 1 in which: the inner hub-forming means has external annular grooves on opposite ends thereof; and in which the portions of the side plates bordering the central apertures therein are seated within said annular grooves in the ends of the inner hub-forming means.

5. The self-threading motion picture film reel as set forth in claim 1 in which: integrally-formed annular ribs project from both sides of the outer hub-forming means a distance slightly greater than the thickness of the flanges; the side plates each include an outwardly-offset annular rim that rests against said annular rib on the outer hub-forming means and cooperates therewith and with the adjacent face of said hub-forming means to define the radial grooves; and the inside diameter of the central opening in the flanges is slightly greater than the outside diameter of the annular rib so as to allow said flanges to rotate freely thereon.

6. The self-threading motion picture film reel as set forth in claim 1 in which: a plurality of teeth are arranged around the outer hub-forming means spaced apart to correspond to the spacing of selected sprocket holes in the film; and in which the outer hub-forming means includes a band encircling same having said teeth projecting therefrom.

7. The self-threading motion picture film reel as set forth in claim 5 in which: an integrally-formed outwardly-facing annular shoulder interconnects the side-plate with its offset rim, said shoulder having an outside diameter corresponding to the inside diameter of the outer hub-forming means so as to recess said side plate therein.

References Cited

UNITED STATES PATENTS

| | | | |
|---|---|---|---|
| 3,298,625 | 1/1967 | Babcock | 242—74 X |
| 3,315,911 | 4/1967 | Bundschuh et al. | 242—74 |
| 3,325,112 | 6/1967 | Keznickl | 242—74 |

NATHAN L. MINTZ, *Primary Examiner.*